No. 827,073. PATENTED JULY 31, 1906.
D. BALTZER.
STAIR CARPET OR ROD HOLDER.
APPLICATION FILED NOV. 9, 1905.
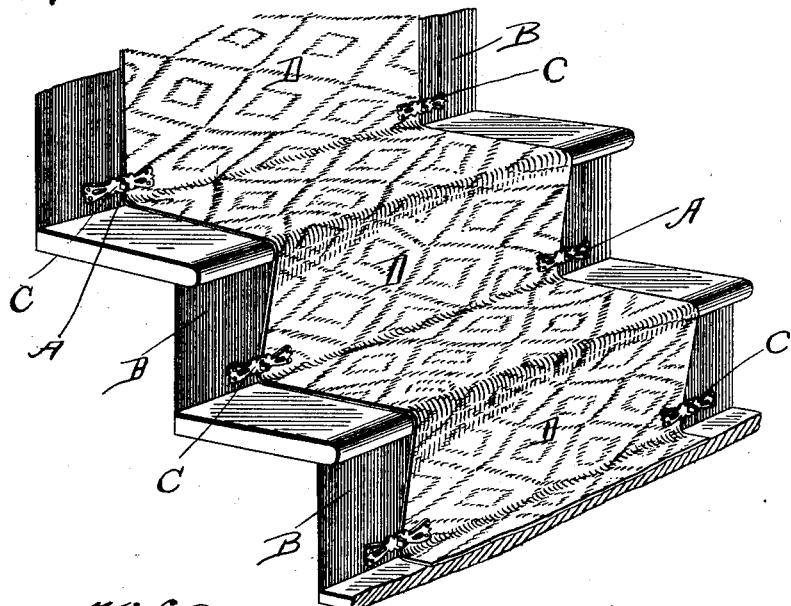
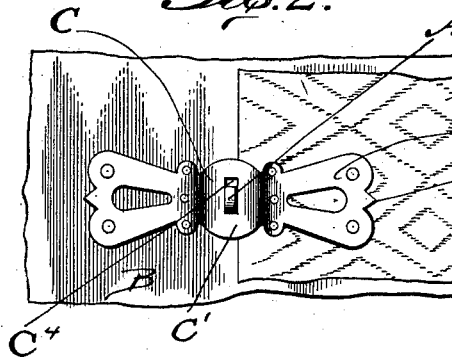
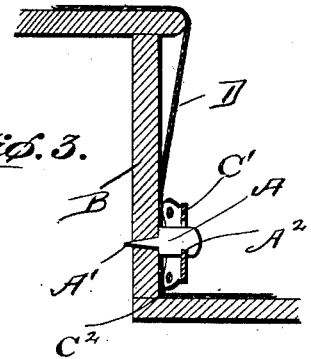
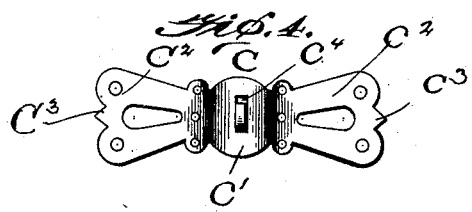
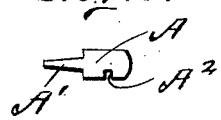
WITNESSES:
B. M. Offutt
C. B. McBath
INVENTOR
Daniel Baltzer
by O'Meara & Brock
ATTORNEYS

UNITED STATES PATENT OFFICE.

DANIEL BALTZER, OF LEHIGHTON, PENNSYLVANIA.

STAIR CARPET OR ROD HOLDER.

No. 827,073.

Specification of Letters Patent.

Patented July 31, 1906.

Application filed November 9, 1905. Serial No. 286,559.

*To all whom it may concern:*

Be it known that I, DANIEL BALTZER, a citizen of the United States, residing at Lehighton, in the county of Carbon and State of Pennsylvania, have invented a new and useful Improvement in Stair Carpet and Rod Holders, of which the following is a specification.

This invention is a new construction of fastening device for securing stair-carpet to the stairs either with or without a stair-rod.

The object of the invention is to provide an exceedingly cheap, simple, and efficient fastening means which can be quickly and easily manipulated to fasten or unfasten the carpet and one which will not present a disagreeable appearance after the carpet has been removed in case it is desired to keep the entire fastening device upon the stairs.

With these and certain other objects in view the invention consists, essentially, in the employment of a stud or pin adapted to be driven in the riser of the stair and having a notch in the under side thereof and a slotted plate adapted to be placed over the said stud or pin and engage the notch thereof, the ends of said plate being bent obliquely to the central portion of the plate, whereby the said ends contact with the riser of the stair and the carpet or the stair-rod to be secured.

The invention also consists of certain details of construction and novelties of combination, all of which will be fully described hereinafter and pointed out in the claims.

In the drawings forming a part of this specification, Figure 1 is a perspective view showing the practical application of my invention, the fasteners being employed to secure the stair-carpet without the use of a rod. Fig. 2 is a detail face view. Fig. 3 is a vertical sectional view. Fig. 4 is a view of the fastener and the stud to which it is connected. Fig. 5 is a side view of the stud or pin.

In the practical embodiment of my invention I employ a stud or pin A, having a pointed end A', which is driven into the riser B of the stairs. A notch $A^2$ is produced in the under side of the said stud or pin for the purpose hereinafter explained. This stud or pin is preferably made flat, as shown, although such construction is not absolutely necessary. It is essential, however, that the stud should have a notch in the under side thereof and that the said stud should be held against rotation while in use. In connection with the notched stud or pin I employ a plate C, comprising the central portion C' and the wings $C^2$, said central and winged portions being made any size and shape desired, and in practice I prefer to have the ends of the wings formed with points $C^3$ in order to firmly engage the riser of the stair in the face of the carpet D. The central portion C' is slotted vertically, as shown at $C^4$, through which the end of the stud passes, and the lower edge of the slot $C^4$ engages and fits into the notch $A^2$, as most clearly shown in Fig. 3.

The plate C is made of spring metal, and the wings $C^2$ are bent obliquely away from the said central plate, as shown, and when setting the plate in position it is first placed over the end of the stud and the central portion pressed inwardly until the said plate is made to engage the notched stud, and the elasticity of the spring will hold the said plate and stud in engagement, and at the same time the wings bearing upon the carpet will hold the said carpet firmly in position, and owing to the shape of the stud or pin and the slot in the plate it is obvious that all danger of turning is entirely avoided.

If desired, stair-rods can be used in connection with the carpet, the wings $C^2$ bearing upon the ends of the stair-rods and holding them in position. In order to disengage the fastener, it is only necessary to press the central portion of the plate downwardly, thereby disengaging it from the notched stud, and it can then be immediately removed. In driving the pins or studs into the riser of the stair the slotted plate can be reversed and placed against the riser and serve as a guide in setting the stud or pin.

It is obvious that, if desired, the fasteners can be left upon the stairs after the carpet has been removed, as the device is usually made in ornamental designs, and therefore does not present a disagreeable appearance.

Having thus fully described my invention, what I claim as new, and desire to secure by Letters Patent, is—

1. An improved means for fastening stair-carpets comprising a stud having a notch and a plate having a vertical slot, said plate having the end portions thereof bent obliquely in the same direction away from the central portion of said plate as set forth.

2. An improved means for fastening stair-carpets comprising a stud having a notch in the under side thereof and a spring-metal plate having a central vertical slot, the end portions of said plate being bent obliquely in the same direction away from the central portion of the plate, for the purpose specified.

3. A device of the kind described comprising a stud having a notch in the lower side thereof, a spring-metal plate consisting of the central portion having a vertical slot, and the winged portions bent obliquely in the same direction away from the central portion and each winged portion having a point at its end, as set forth.

DANIEL BALTZER.

Witnesses:
HOMER HEBERLING,
JOHN SEABOLDT.